US012388218B2

(12) United States Patent
Little

(10) Patent No.: US 12,388,218 B2
(45) Date of Patent: Aug. 12, 2025

(54) ELECTRICAL CONNECTOR ASSEMBLY HAVING A POLARIZING FEATURE AND A LATCHING FEATURE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 370 days.

(21) Appl. No.: 17/881,479

(22) Filed: Aug. 4, 2022

(65) Prior Publication Data

US 2023/0052621 A1 Feb. 16, 2023

Related U.S. Application Data

(60) Provisional application No. 63/260,134, filed on Aug. 10, 2021.

(51) Int. Cl.
*H01R 13/627* (2006.01)
*H01R 13/447* (2006.01)

(52) U.S. Cl.
CPC ....... *H01R 13/6272* (2013.01); *H01R 13/447* (2013.01)

(58) Field of Classification Search
CPC .............. H01R 13/6272; H01R 13/447; H01R 13/6273; H01R 13/506
See application file for complete search history.

(56) References Cited

U.S. PATENT DOCUMENTS

2020/0076132 A1* 3/2020 Yang ...................... H01R 12/73
2020/0266584 A1* 8/2020 Lu .......................... H01R 12/75
2021/0135404 A1* 5/2021 Jiang .................... H01R 12/724

FOREIGN PATENT DOCUMENTS

CN 209981627 U * 1/2020 ........... H01R 12/774
CN 112952423 A 6/2021

* cited by examiner

*Primary Examiner* — Jean F Duverne
(74) *Attorney, Agent, or Firm* — Ming Chieh Chang

(57) ABSTRACT

An electrical connector includes a contact assembly, a cable assembly terminated to the contact assembly, a cover receiving the contact assembly and the cable assembly, a latch disposed at a bottom of the cover for latching to a mating connector, and an un-mating assembly mounted to the cover and including a lift bar, wherein the latch is operable to unlatch from the mating connector in response to an upward movement of the lift bar while moving upward to dislodge the cover from the mating connector.

15 Claims, 15 Drawing Sheets

ELECTRICAL CONNECTOR ASSEMBLY HAVING A POLARIZING FEATURE AND A LATCHING FEATURE

CROSS REFERENCE TO RELATED APPLICATIONS

This application claims priority to U.S. Provisional Patent Application No. 63/260,134, filed on Aug. 10, 2021, the content of which is incorporated by reference in its entirety.

BACKGROUND OF THE INVENTION

1. Field of the Invention

The present invention relates to an electrical connector assembly including a receptacle connector and a plug connector.

2. Description of Related Arts

U.S. Patent Application Publication No. 2020/0266584 discloses an electrical connector assembly including a plug connector and a mating receptacle connector. The plug connector includes alignment tabs at two opposite ends thereof and the receptacle connector includes notches at two opposite ends thereof configured to receive the alignment tabs. During a detachment operation, a user may operate a handle via a pull tab to urge the alignment tabs in a direction vertically away from the receptacle connector to dislodge the plug connector without applying any mis-oriented pressure on the receptacle connector and/or the plug connector. The plug connector may also include legs at one side thereof and the receptacle connector may also include spaces defined by spaced-apart portions at one side thereof configured to receive the legs to achieve a general alignment during an initial part of a mating operation.

China Patent Publication No. CN112952423A discloses a receptacle connector including a first insulator, a first electric connecting part, and a shell. The first electric connecting part is set in the first insulator, the shell surrounds the first insulator and includes a pair of end walls opposite to each other, each end walls defines a lock hole, and an inserting groove is defined between each end wall and the first insulator. Therefore, a right handed cable plug connector or a left handed cable plug connector can be mated with the receptacle connector on a printed circuit board (PCB). The receptacle connector occupies a large space on the PCB.

Therefore, an improved electrical connector is desired to overcome the disadvantages of the prior arts.

SUMMARY OF THE INVENTION

An object of the present invention is to provide an electrical connector assembly with improved polarizing feature and/or locking feature.

In order to achieve above-mentioned object, an electrical connector includes a contact assembly, a cable assembly terminated to the contact assembly, a cover receiving the contact assembly and the cable assembly, a latch disposed at a bottom of the cover for latching to a mating connector, and an un-mating assembly mounted to the cover and including a lift bar, wherein the latch is operable to unlatch from the mating connector in response to an upward movement of the lift bar while moving upward to dislodge the cover from the mating connector.

Other objects, advantages and novel features of the present invention will become more apparent from the following detailed description of the present embodiment when taken in conjunction with the accompanying drawings.

DETAILED DESCRIPTION OF THE PREFERRED EMBODIMENT

Figure 1:
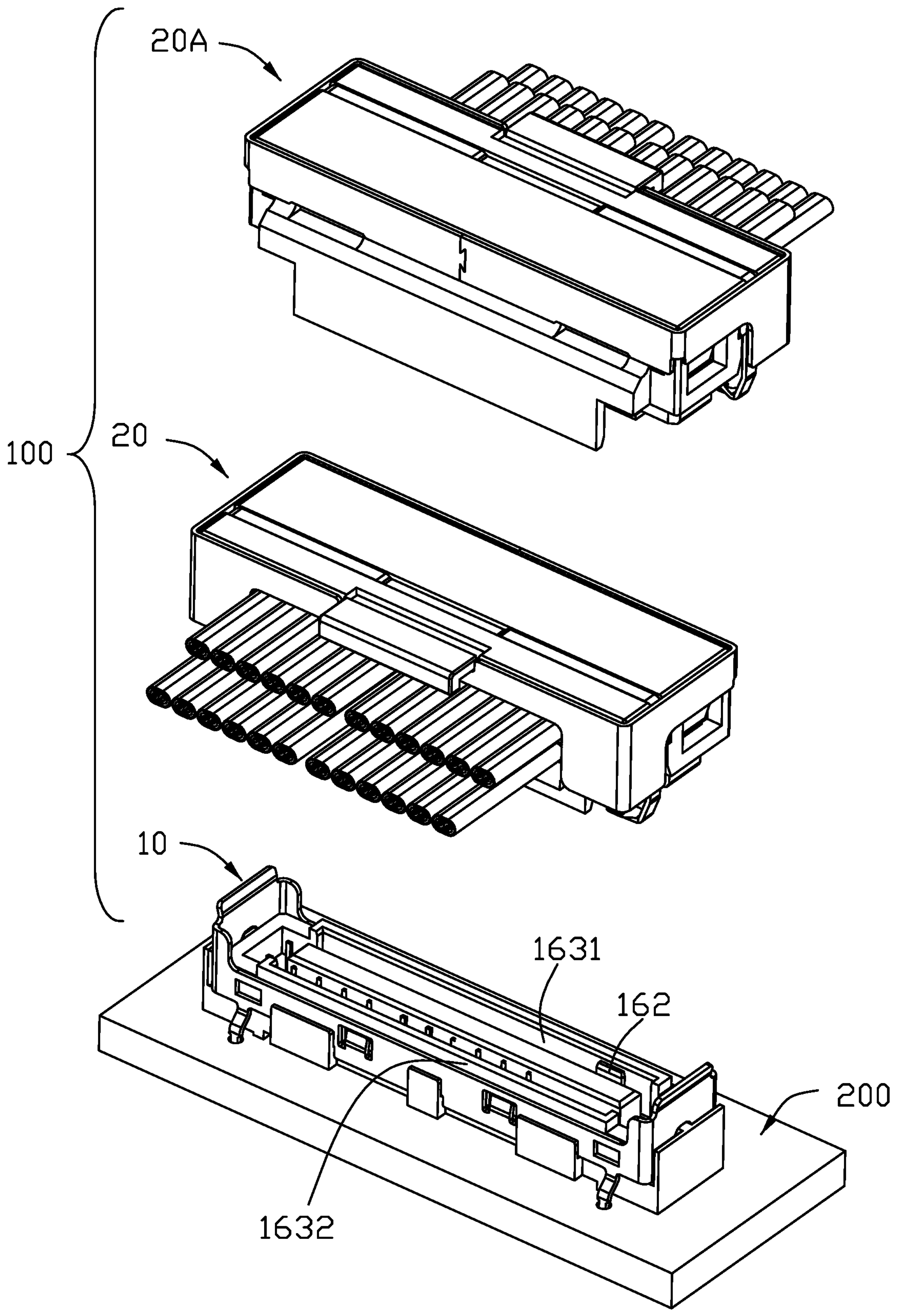
FIG. 1 is a top perspective view of an electrical connector assembly in accordance with the present invention mounted on a printed circuit board.

Reference will now be made to the drawing figures to describe the preferred embodiment of the present invention in detail.

Referring to FIGS. 1-15, an electrical connector assembly 100 of an embodiment of this present invention comprises a receptacle connector 10 to be mounted on a printed circuit board (PCB) 200 and a cable plug connector 20 connecting with two rows of cables. The receptacle connector 10 features a tongue in receptacle design where non-cantilever beam tongue is adopted in order to reduce overall mating height. The plug connector 20 features cantilever beam design in order to reduce overall mating height and provide adequate wiping distance.

Figure 2:
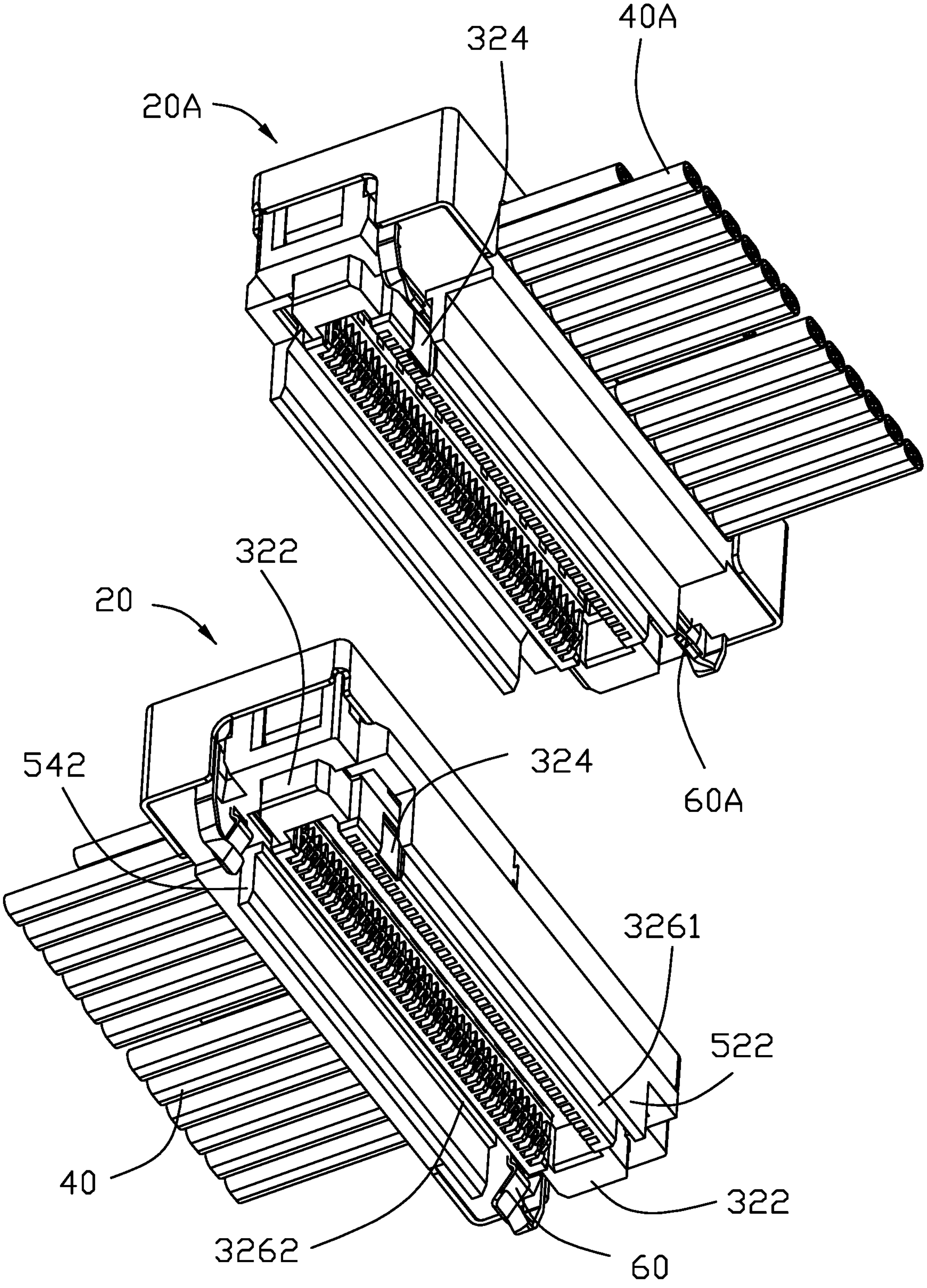
FIG. 2 is a bottom perspective view of plug connectors of the electrical connector assembly.
Figure 3:
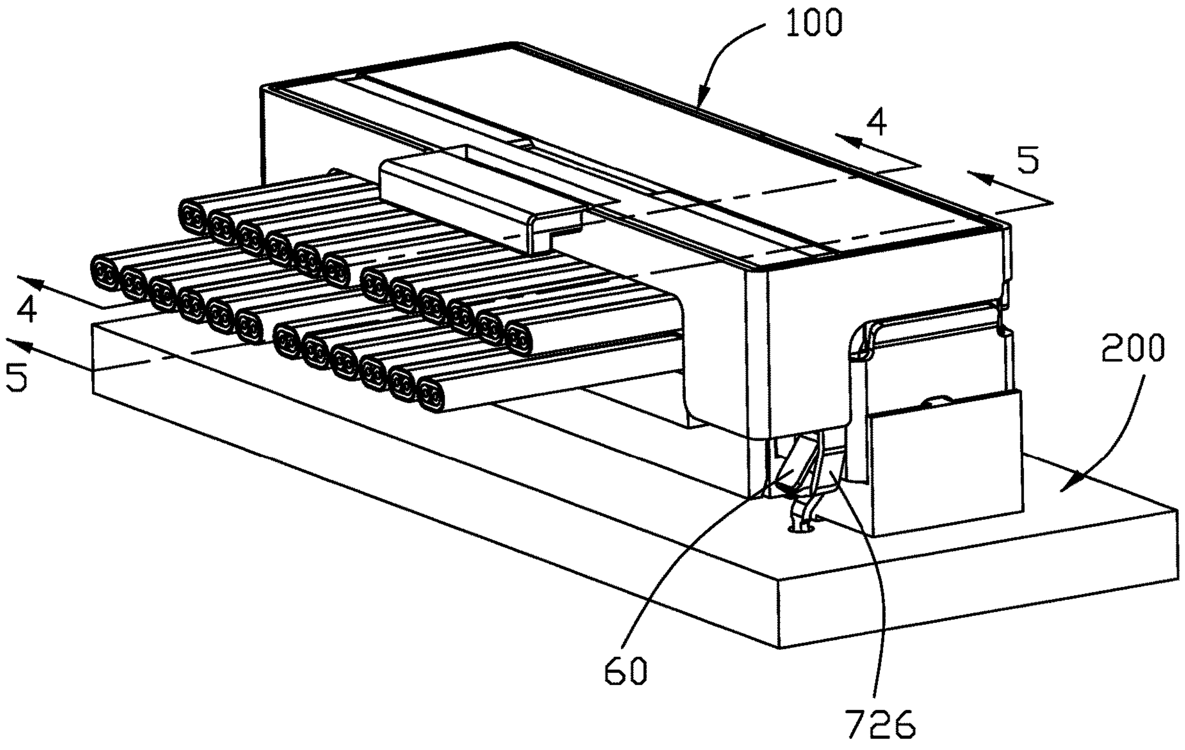
FIG. 3 is an assembled perspective view of the electrical connector assembly.

Also shown in each of FIGS. 1 and 2, another plug connector 20A is shown of similar construction to the plug connector 20. As shown, the plug connector 20 has a left-hand cable exit and the plug connector 20A has a right-hand cable exit. The left-handed cable plug connector 20 has two rows of cables 40 extending to a left side, the right-handed cable plug connector 20A has two rows of cables 40A extending to a right side. Please notes, left and right is used to describe an opposite direction. The receptacle connector 10 is symmetrical in a sense that it can be placed in two orientations on the PCB 200 for mating with either one of the two plug connectors 20 and 20A. Understandingly, when the receptacle connector 10 is mounted on the PCB 200, the terminal assignment is definitive, the plug connector 20 must inserted in a pre-determined direction to keep the terminal assignment consistent. When the PCB 200 is loaded with other elements, the left-handed cable plug connector 20 or the right-handed cable plug connector 20A is selected by space limitation on the PCB 200. If not, the cables must bend to meet space limitation. On the other hand, a polarizing feature may be designed into the electrical connector assembly 100 so that either one of the two plug connectors 20 and 20A may only be mated to the receptacle connector 10 in only one orientation.

Referring to FIGS. 6-12 in particular, the plug connector 20 includes a contact assembly 30, a cable assembly 40 terminated to the contact assembly 30, an insulative cover 50 receiving the contact assembly 30 and the cable assembly 40, a pair of latches 60 disposed at a bottom of the cover 50, and an un-mating assembly 70 mounted to the cover 50. The plug connector 20 may further include a metallic shroud 80 for added strength. The cable assembly 40 includes plural cables extending in a lateral direction perpendicular to a mating direction along which the plug connector 20 and the receptacle connector 10 are to be mated. In this embodiment, the mating direction is defined in an upright direction, the wires extend horizontal. The wires extend angled to the mating direction. The latches 60 and the un-mating assembly are located at a lateral outside of one side wall 326 of the insulating housing 32 from which the cables reach out.

The plural cables of the cable assembly 40 are arranged in an upper row and a lower row. The contact assembly 30 may include an insulative housing 32, a front and a rear insert-molded contact modules (not labeled) mounted in the insulative housing 32, and an upper and a lower ground bars retaining the upper and the lower rows of cables to the front and the rear contact modules. Further detail concerning the cable assembly and the contact assembly is provided in commonly owned corresponding U.S. Patent Application No. 63/201,807 filed on May 13, 2021, the content of which is incorporated herein by reference. The insulative housing 32 defines a mating cavity 311 opening downwards and the terminals 312 exposed to the mating cavity 311. The longitudinal insulative housing 32 includes two side walls 326 and two end walls (not labeled) collectively defining the mating cavity 311. The insulative housing 32 may have a pair of enlarged locating lugs 322 at two opposite longitudinal end walls thereof for purpose of blind mating to the receptacle connector 10.

The cover 50 includes an upper cover part 52 having a first blind mating lug 522 and a lower cover part 54 having a second blind mating lug 542 opposing the first blind mating lug 522. The upper cover part 52 and the lower cover part 54 may be secured to each other by any suitable means.

Figure 4:
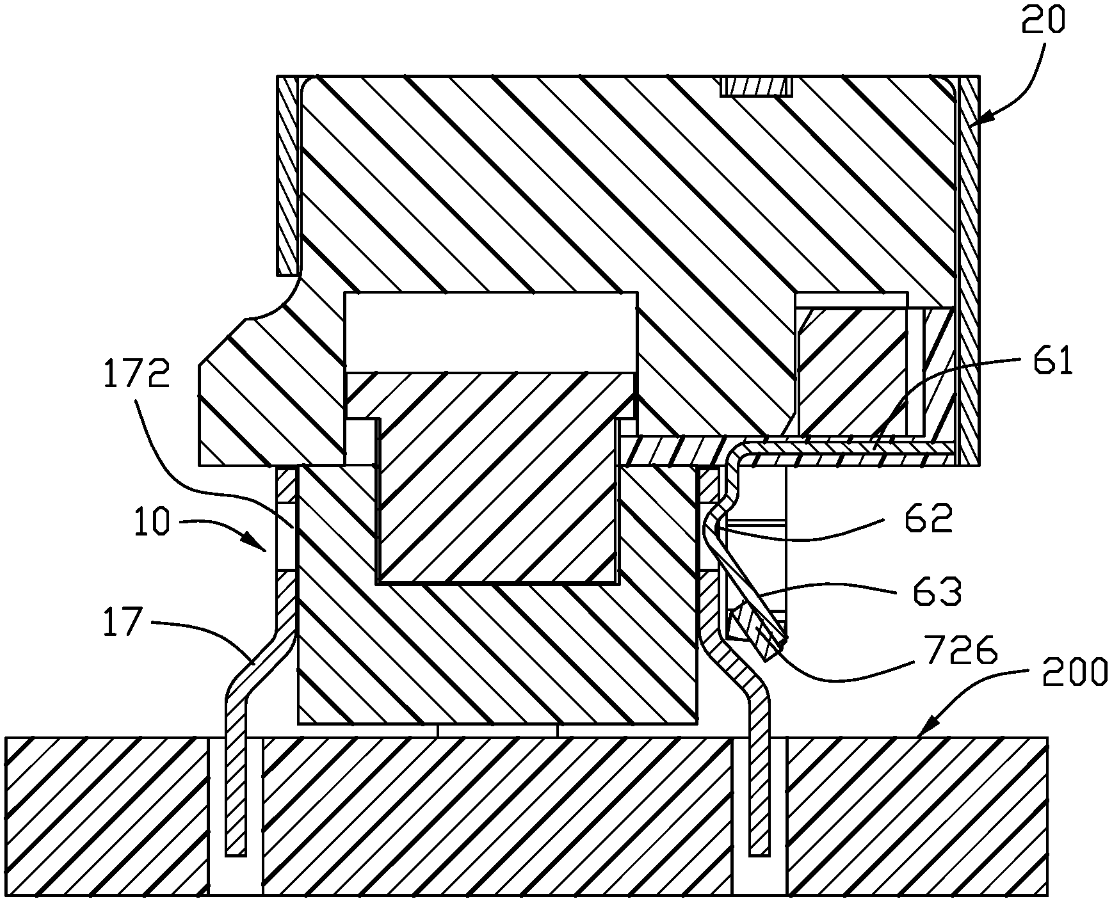
FIG. 4 is a cross-sectional view of the electrical connector assembly taken along lines 4-4 in FIG. 3.

The latch 60 may be secured to the bottom of the lower cover part 54 by any suitable means. In the embodiment shown, a pair of the latches 60 is embedded, such as by insert molding, in the lower cover part 54. If desired, the latch 60 may also be secured to the bottom of the upper cover part 52 by any suitable means. As another alternative, instead of formed separately, the latches 60 may be formed on the metallic shroud 80 to then extend to a location near the bottom of the cover 50. In this embodiment as shown in FIG. 4, the latch 60 includes a retained portion 61 embedded in the cover 50, a middle arc latching portion 62 protruding towards the side wall 326 and a slant end portion 63 extending outwards from the latching portion away from the insulative housing 32.

The un-mating assembly 70 includes a lift bar 72 and a push button 76 for moving the lift bar 72 upward. The lift bar 72 is mounted in a channel 524 of the upper cover part 52. The lift bar 72 has an intermediate portion 722 and two end portions 724 terminating as hooks 726. The push button 76 is disposed under the lift bar 72 and has a cam surface 762 engaging the intermediate portion 722. The cam surface 762 is angled to apply a vertical lifting action to the intermediate portion 722. Specifically, as the push button 76 is activated in the lateral direction, the cam surface 762 causes the lift bar 72 to translate in the vertical direction. The hook 726 is angled to apply a vertical lifting action on the latch 60, thereby dislodging the cover 50 from the receptacle connector 10 without applying any mis-oriented pressure on the receptacle connector 10 and/or the plug connector 20. Specifically, the latch 60 is operable to unlatch from the receptacle connector 10 in response to an upward movement of the lift bar 72 while moving upward to dislodge the cover 50 from the receptacle connector 10.

Figure 13:
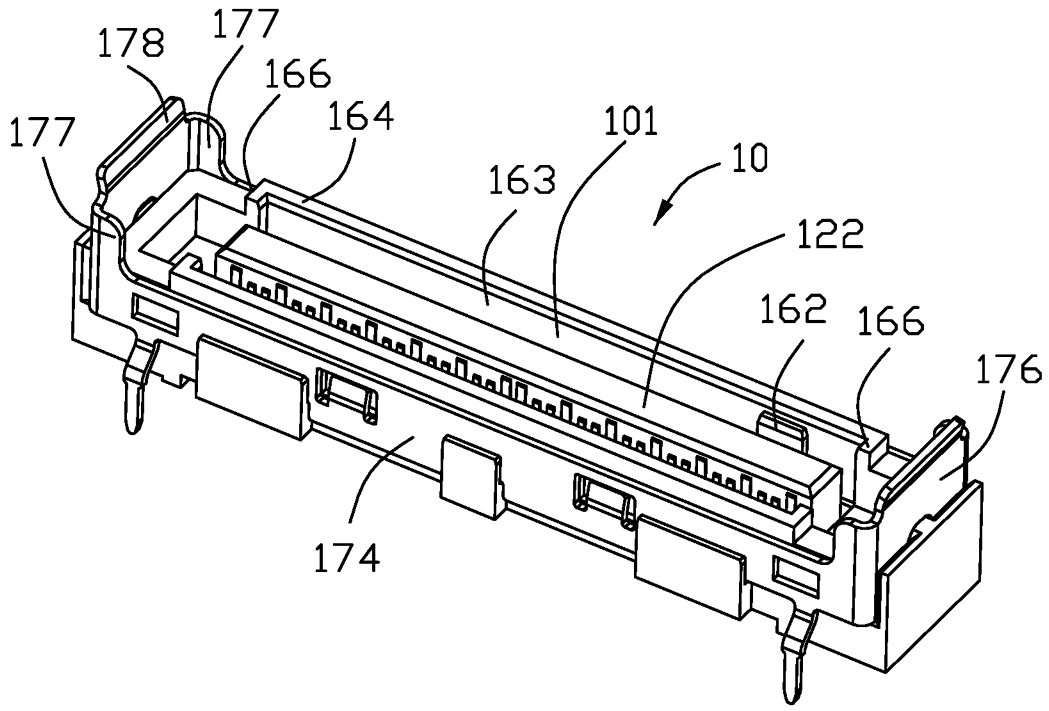
FIG. 13 is a top perspective view of a receptacle connector of the electrical connector assembly.
Figure 14:
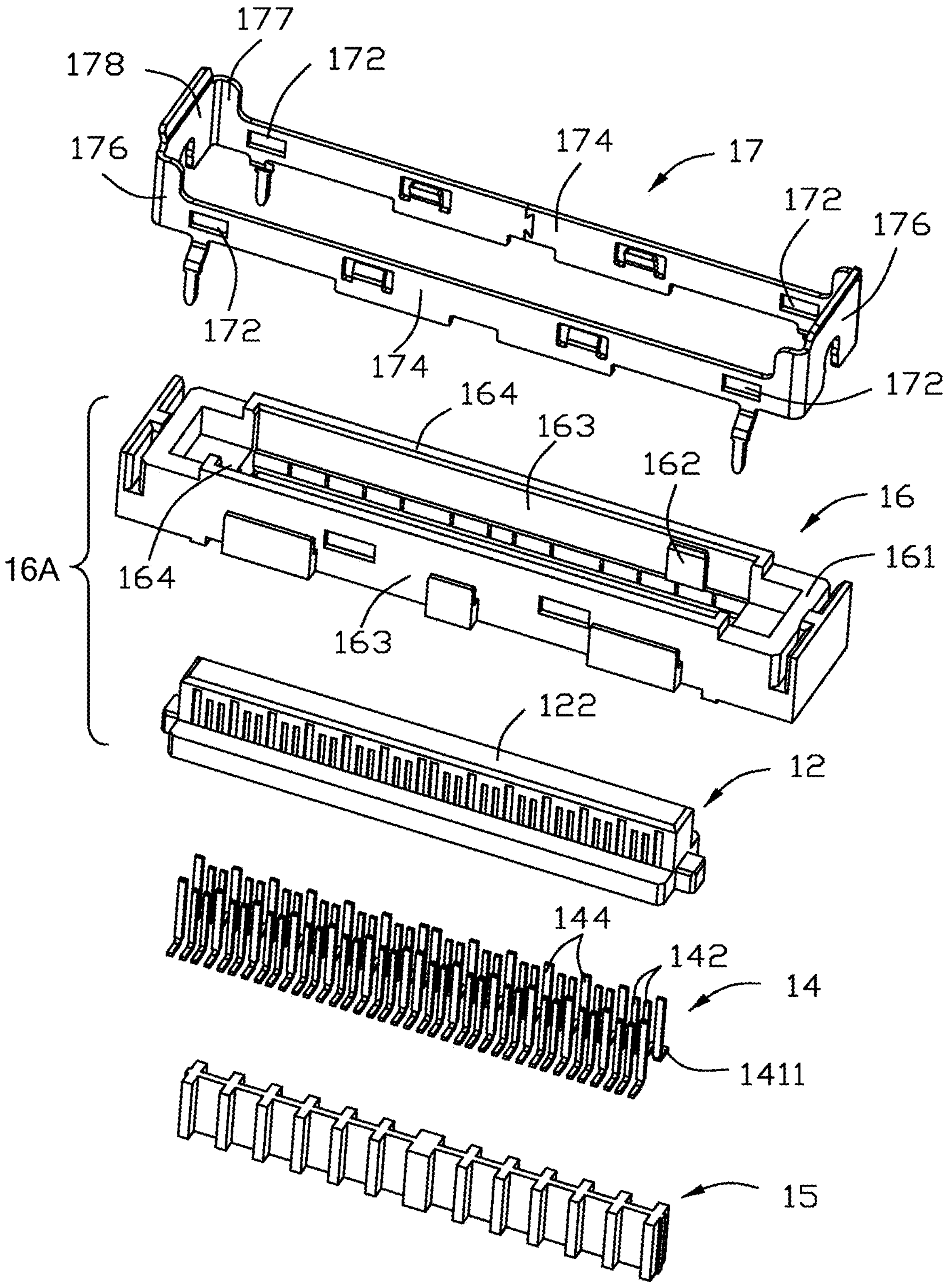
FIG. 14 is an exploded view of the receptacle connector in FIG. 13.
Figure 15:
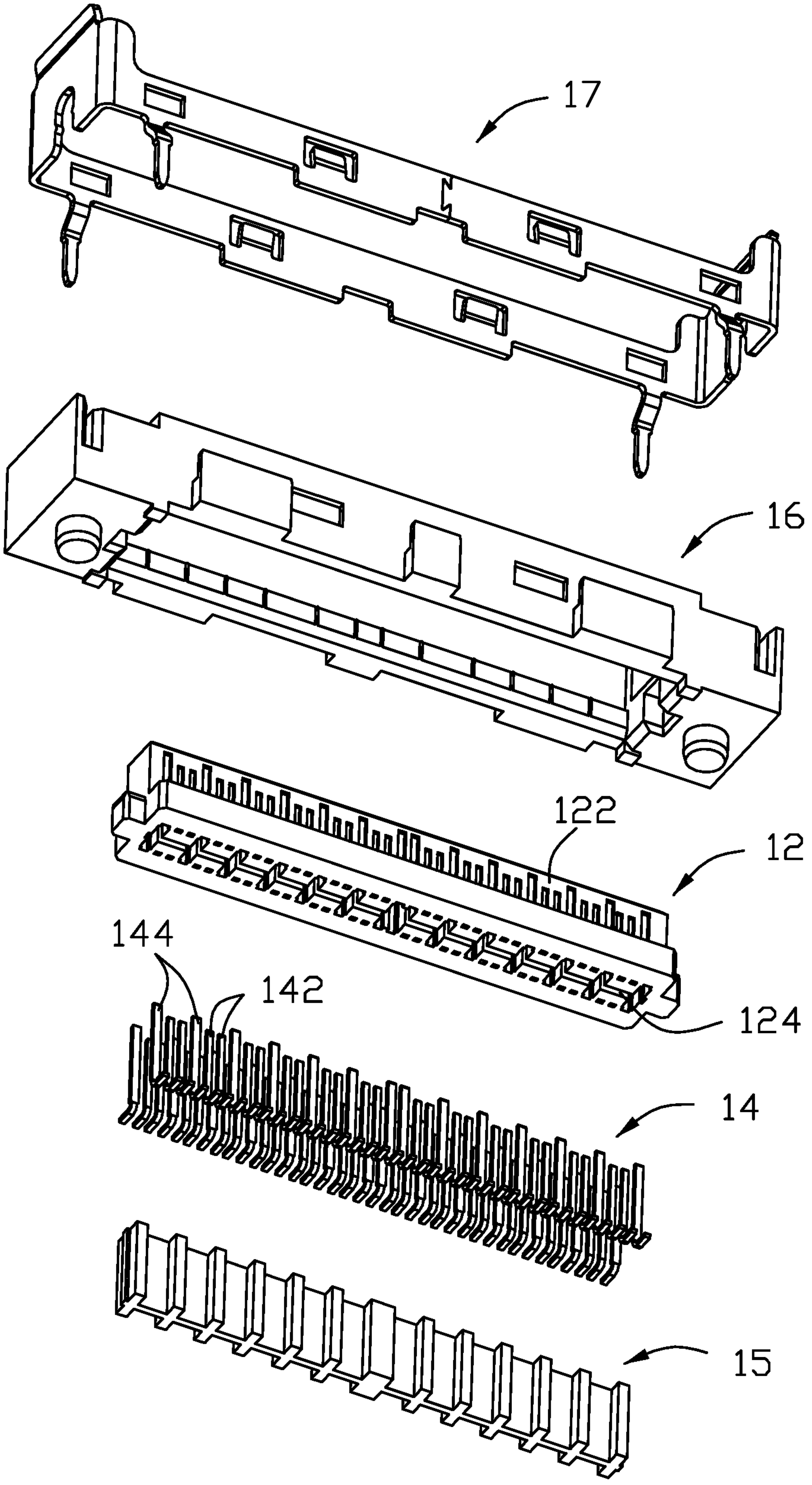
FIG. 15 is a view similar to FIG. 14 but from another perspective.

Referring to FIGS. 13-15 in particular, the receptacle connector 10 includes an insulative housing 12 having a tongue 122 and a cavity 124, two rows of terminals 14 molded in the insulative housing 12 while exposing respectively to two opposite surfaces of the tongue 122, a conductive plastic member 15, an insulative shroud 16 enclosing the insulative housing 12, and a receptacle shell 17 enclosing the shroud 16. The insulative shroud 16 and the insulative housing 12 are to be retained together to form a receptacle housing 16A, as shown in FIG. 14. The receptacle housing 16A defines a receiving cavity 101 between two side walls 163 parallel to the tongue 122 and two end walls 161 connecting with the side walls 163, and the longitudinal tongue 122 is in the receiving cavity 101. Each row of terminals 14 includes a plurality of signal terminals 142 and a plurality of ground terminals 144 and the plurality of ground terminals 144 are exposed to the cavity 124. The conductive plastic member 15 is molded in the cavity 124 to be electrically coupled to the plurality of ground terminals 144. The shroud 16 may have features for securely retaining the insulative housing 12. The shell 17 may have retention features for securely retaining to the shroud 16. The shell 17 may have one or more latching holes 172 on one or both side walls 174 thereof. The signal terminals 142 are preferably arranged in pairs for differential signals transmission.

Figure 12:
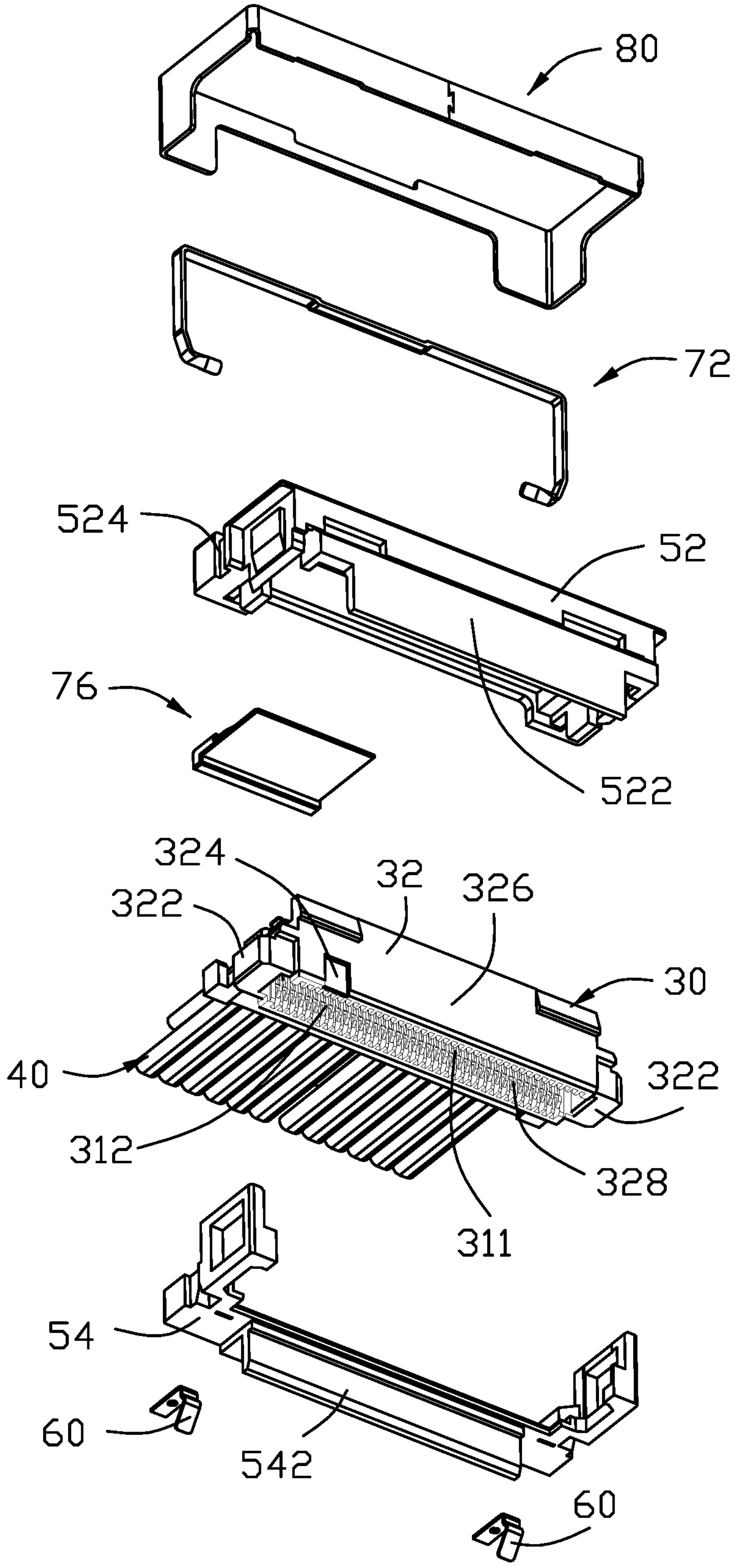
FIG. 12 is a view similar to FIG. 11 but from another perspective.

Turning now to the polarizing feature, as best seen in FIGS. 1-2 in combination with FIGS. 12-13, the insulative housing 32 of the plug connector 20 has a keyway 324 and the shroud 16 of the receptacle connector 10 has a key 162. Each of the keyway 324 and the key 162 generally extends in the mating direction. In this embodiment, the key 162 is defined on the receptacle housing 16A. The side walls 163 of the receptacle housing comprise a first side wall 1631 and a second side wall 1632 opposite to the first side wall. The key 162 is defined on the first side wall 1631 and offset to one end wall, while the second side wall 1632 has no key. In the plug connector 10, the side walls of the insulative housing 32 comprises a front side wall or a first side wall 3261 and a rear side wall or a second side wall 3262, the keyway 324 is defined on the first side wall 3261. As best shown in FIGS. 1-2, in the left handed cable plug connector 20, the keyway 324 is defined on the first side wall 3261 and the cable assembly 40 reaches out from the second side wall 3262, while in the right handed cable plug connector 20A, the insulative housing keep a same direction with the left handed cable plug connector 20, the cable assembly 10A reaches out from the first side wall 3261, and the latch 60A is located near to the first side wall 3261. It is noted that the latch 60 is located at a lateral side of the contact assembly 30 of the plug connector 20 proximal to the cable assembly 40. In the case of the plug connector 20, as shown in FIGS. 1-2, the latch 60 is located proximal to the second side wall 3262, and the keyway 324 is disposed on the first side wall

3261. Understandably, in the case of the plug connector 20A, corresponding keyway 324 is disposed on first side wall 3261, assuming the cable assembly including plural cable wires extending rearward in the lateral direction.

Figure 5:
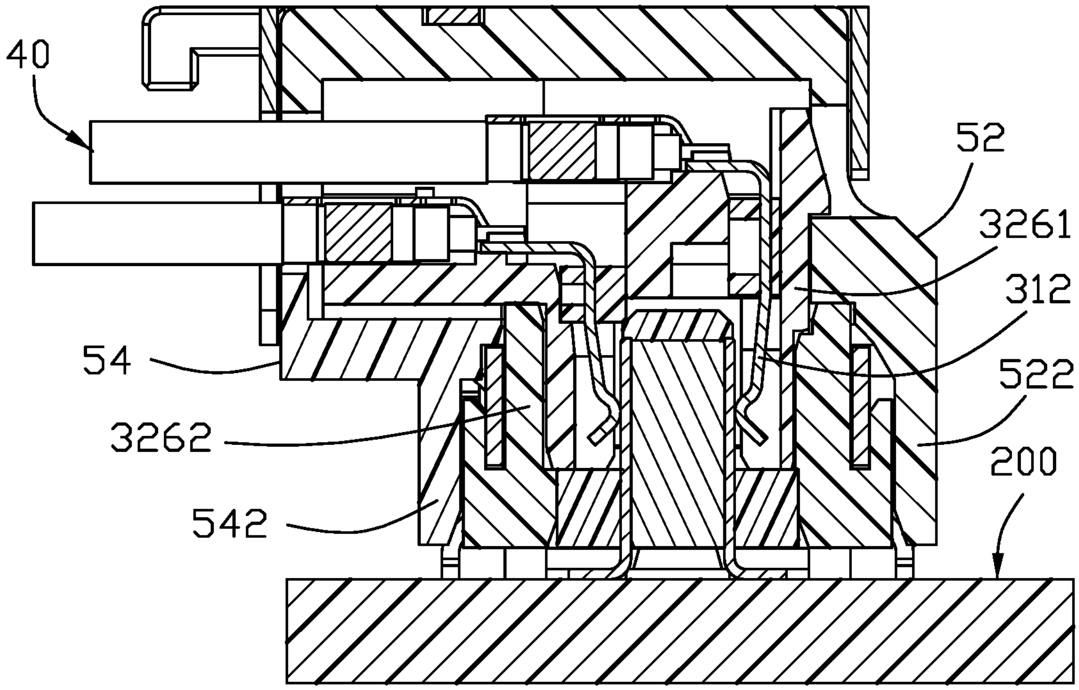
FIG. 5 is another cross-sectional view of the electrical connector assembly taken along lines 5-5 in FIG. 3.
Figure 6:
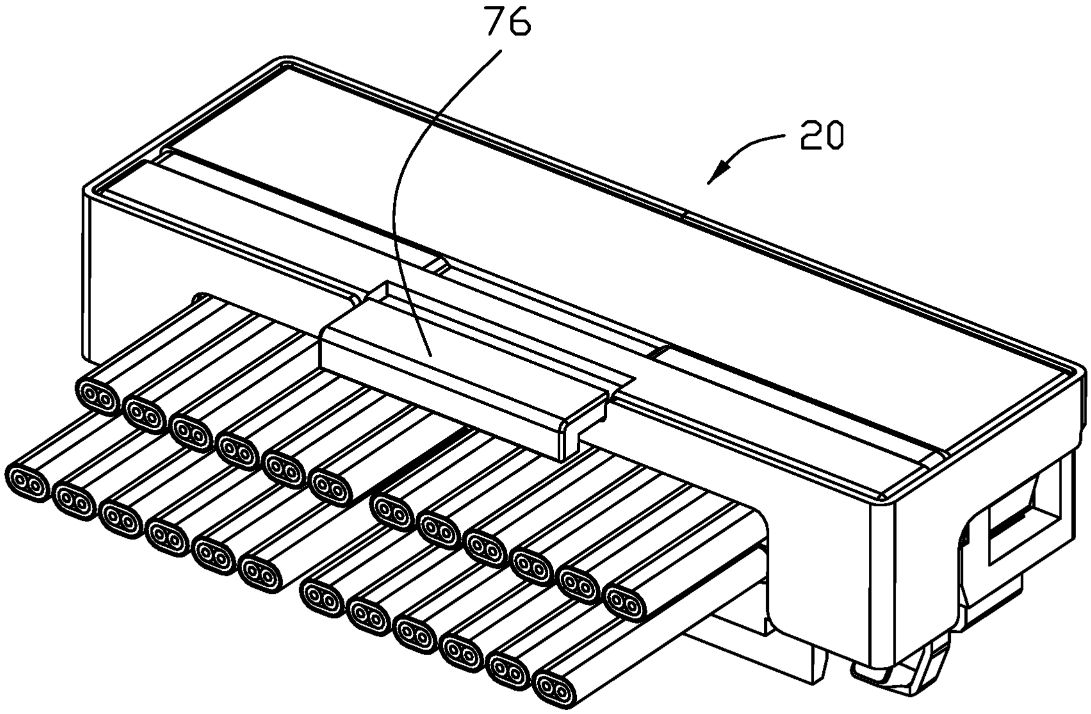
FIG. 6 is a top perspective view of the plug connector.
Figure 7:
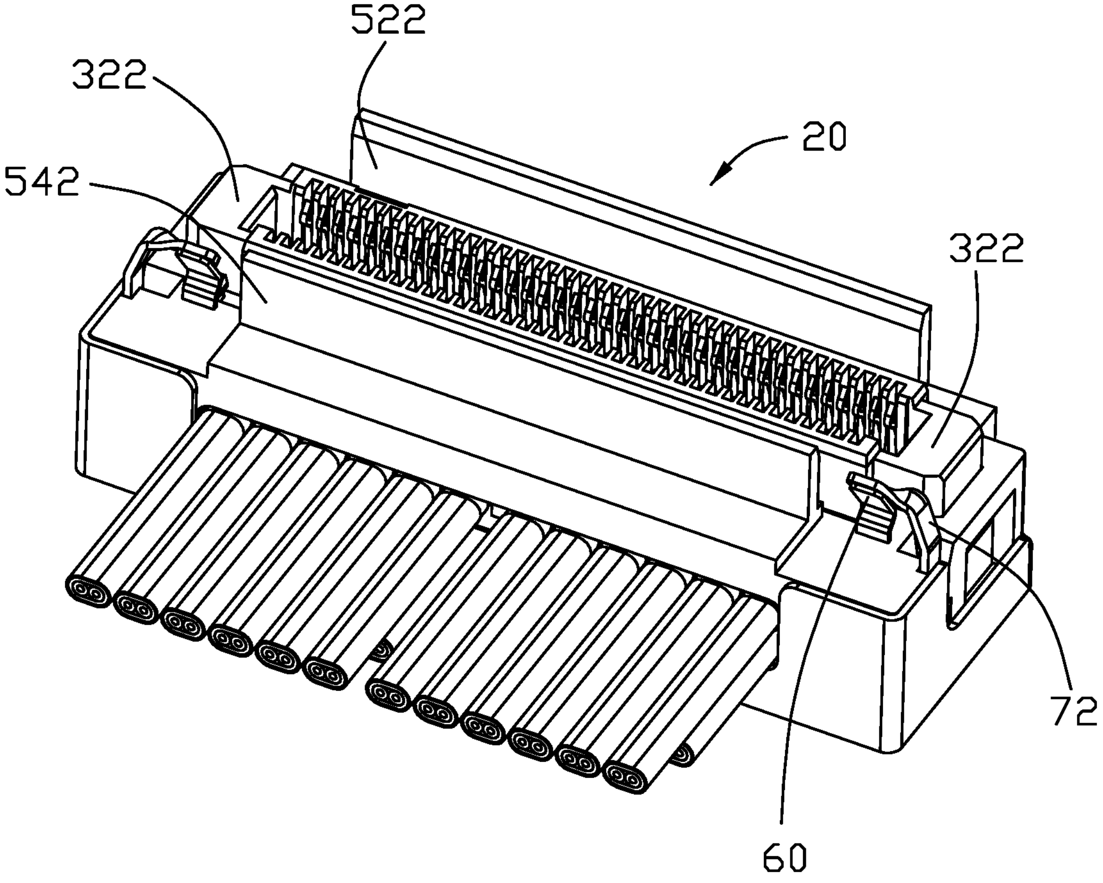
FIG. 7 is a bottom perspective view of the plug connector.
Figure 8:
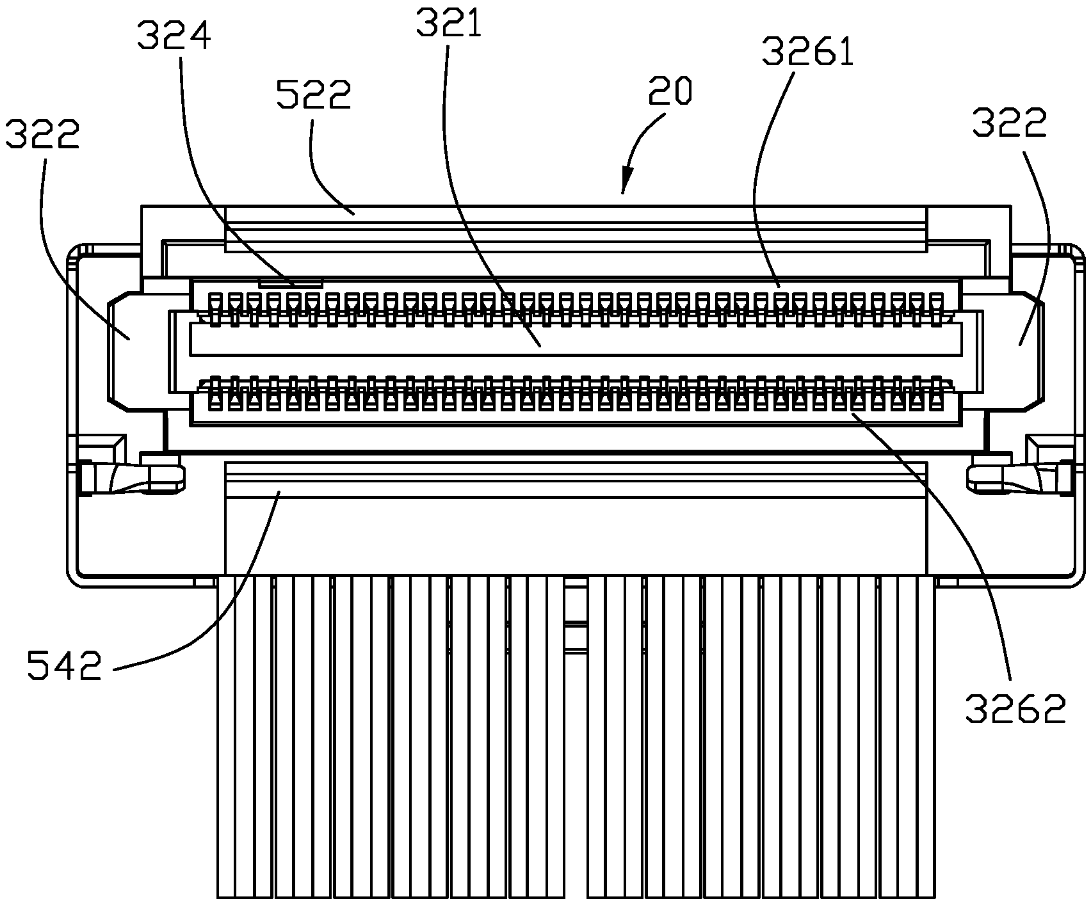
FIG. 8 is a bottom plan view of the plug connector.
Figure 9:
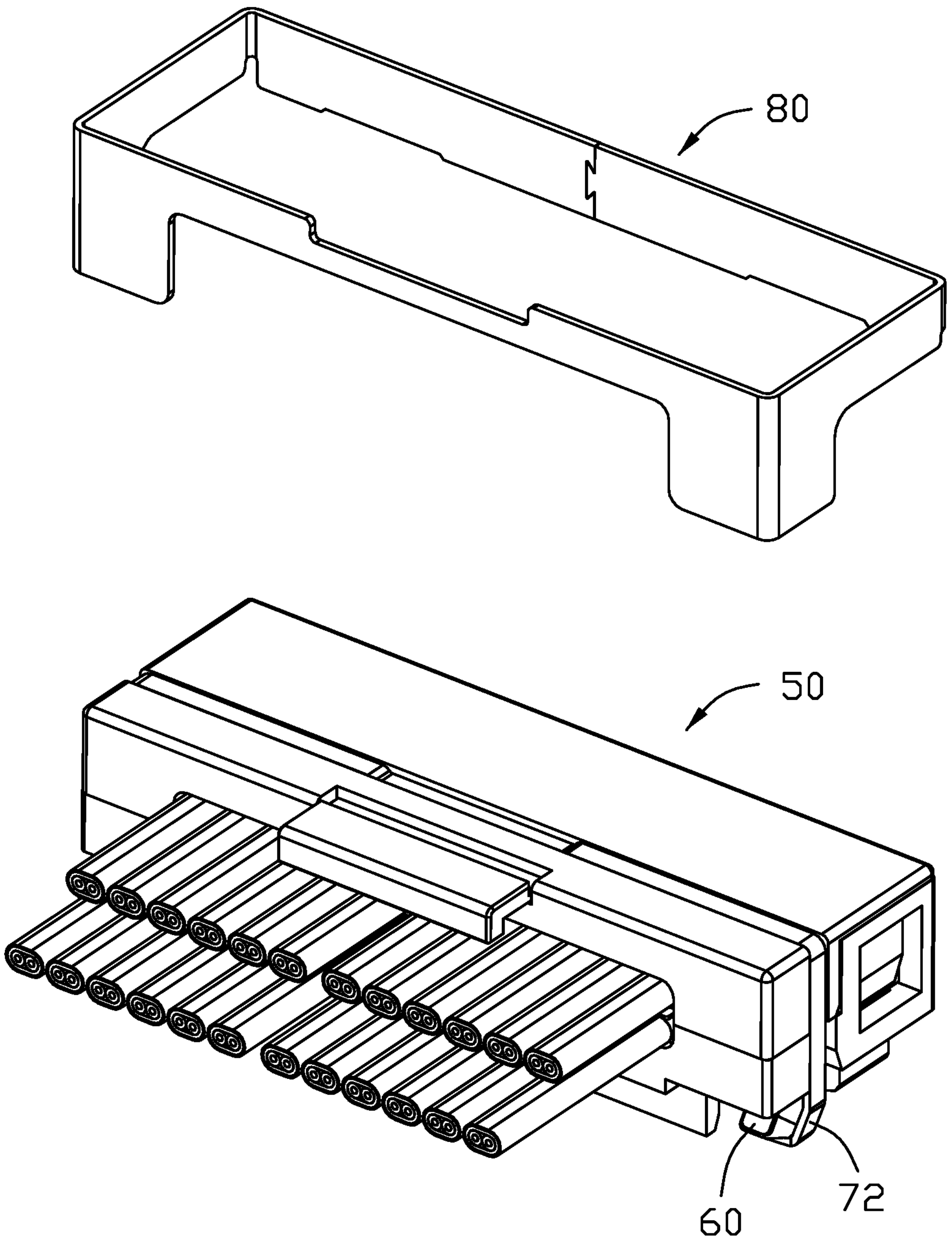
FIG. 9 is an exploded view of the plug connector.
Figure 10:
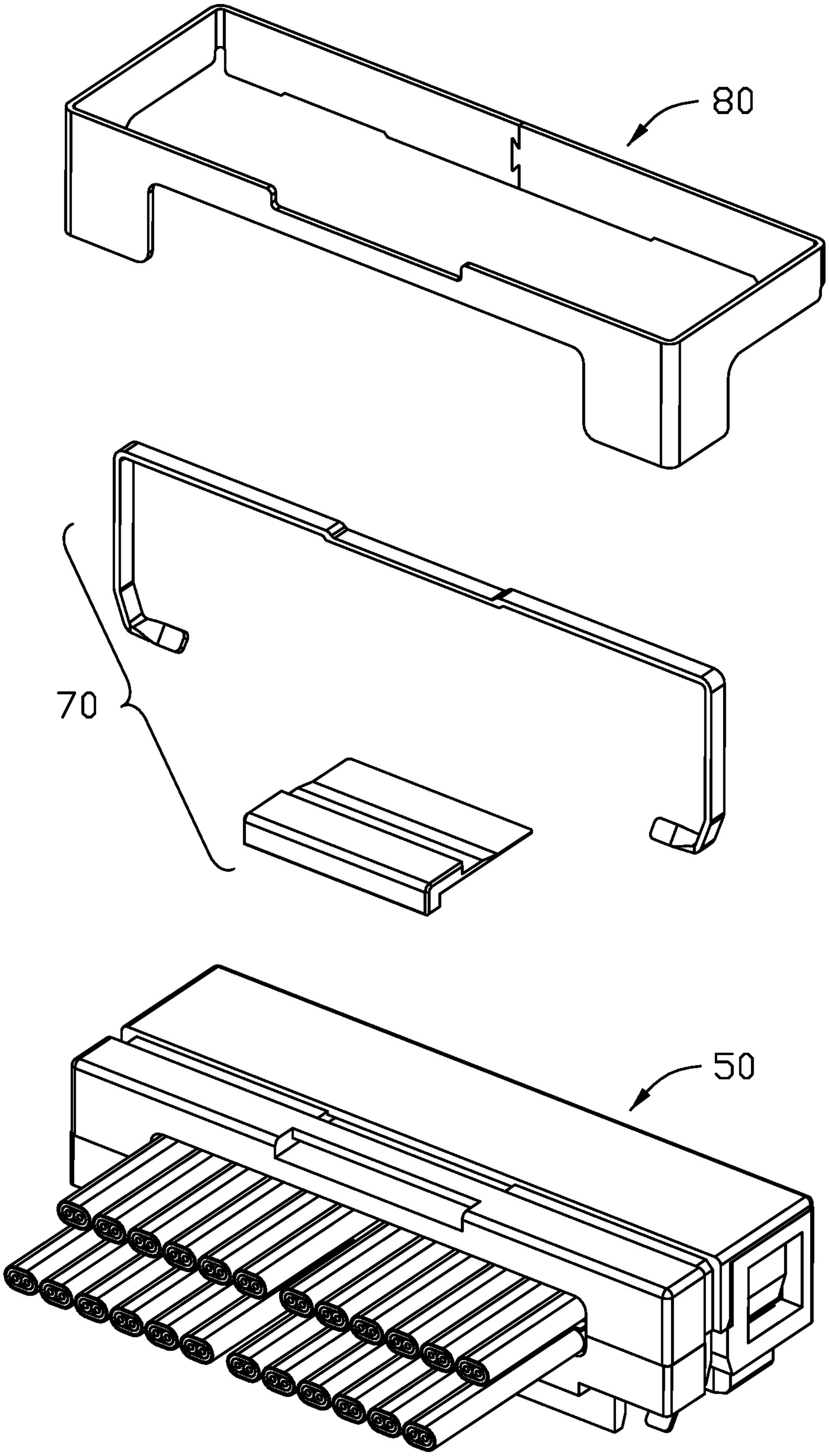
FIG. 10 is a further exploded view of the plug connector in FIG. 9.
Figure 11:
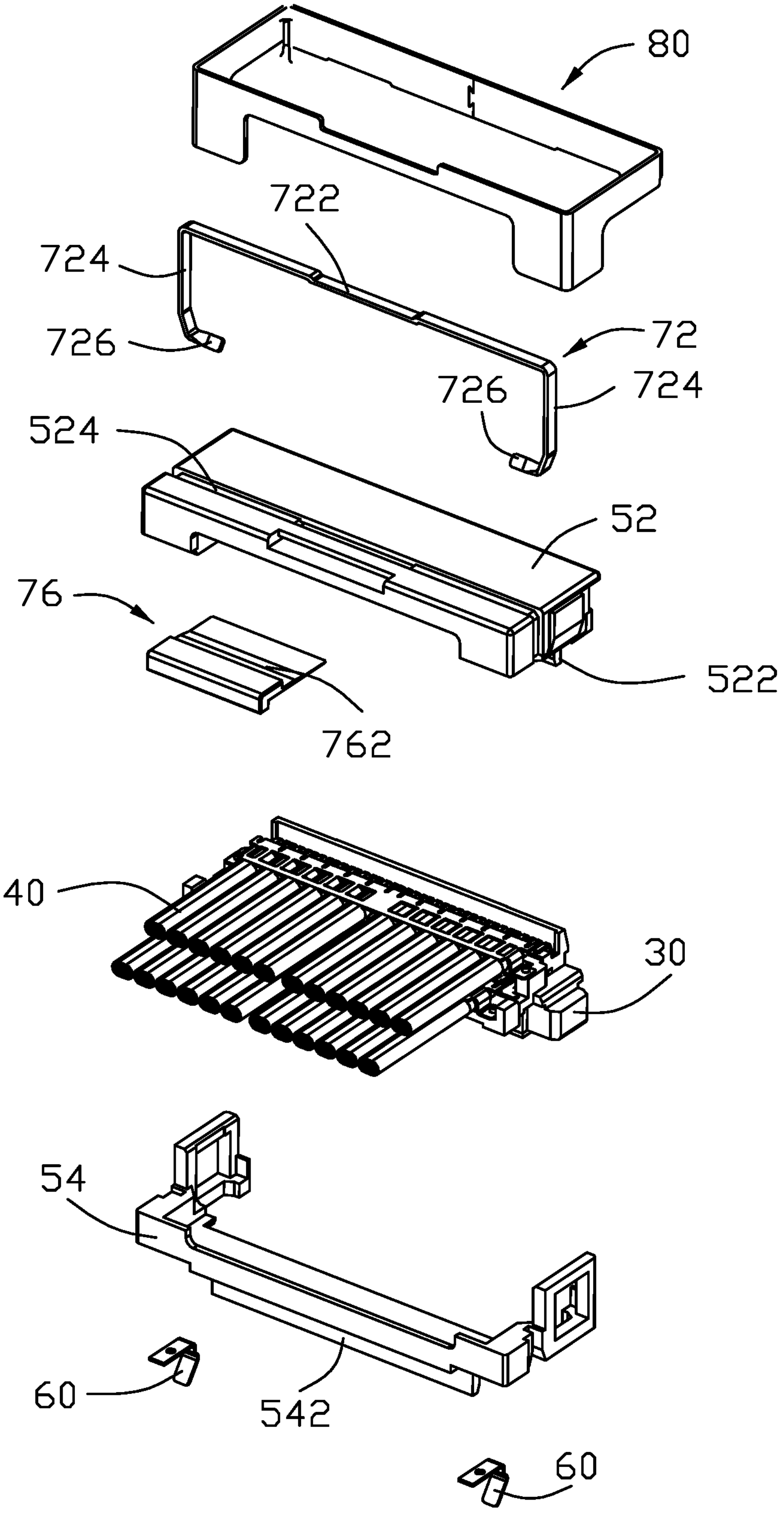
FIG. 11 is a still further exploded view of the plug contact in FIG. 10.

Turning now to the blind mating feature, the first blind mating lug 522 of the upper cover part 52 extends alongside and downward beyond the front/first side wall 3261 and the second blind mating lug 542 of the lower cover part 54 extends alongside and downward beyond the rear/second side wall 3262, as seen in FIG. 5. The first and second blind mating lugs 522 and 542, together with the pair of enlarged locating lugs 322 at two opposite ends of the insulative housing 32, form an effective blind mate structure, as seen in FIG. 2, which keep an easy mating process of such small form factor plug connector into the receptacle connector. The first and second blind mating lugs 522 and 542 also prevent the plug connector 20 from rotating when the plug connector 20 and the receptacle connector 10 are mated. Moreover, as shown in FIGS. 13 and 14, corresponding to plug-side blind mating feature, the receptacle housing 16A is provided with a respective raised portion 164 at each of two side walls 163 thereof in that a top face of the raised portion 164 is leveled higher than a top face of the tongue 122. Each of the two side walls 163 is thinned so that the raised portion 164 has two angled ends 166. Similarly, the receptacle shell 17 is provided with a respective raised portion 178 at each of two end walls 176 thereof. Raised end portions 177 are also formed on the side walls 174 to continue the raised portion 178. These raised portions and ends 164, 166, 177, and 178 together define an interface beneficial for blind mating of the plug and receptacle connectors.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A cable plug connector comprising:

a contact assembly;

a cable assembly terminated to the contact assembly;

an insulative cover receiving the contact assembly and the cable assembly;

a latch disposed at a bottom of the insulative cover for latching to a mating receptacle connector; and an un-mating assembly mounted to the cover and comprising a lift bar;

wherein the latch is operable to unlatch from the mating connector in response to an upward movement of the lift bar while moving upward to dislodge the insulative cover from the mating connector.

2. The cable plug connector as claimed in claim 1, wherein the cover comprises an upper cover part having a first blind mating lug and a lower cover part having a second blind mating lug opposing the first blind mating lug.

3. The cable plug connector as claimed in claim 1, wherein the latch is separately attached to a bottom face of the cover.

4. The cable plug connector as claimed in claim 1, wherein the un-mating assembly comprises a push button for moving the lift bar upward.

5. The cable plug connector as claimed in claim 1, wherein the contact assembly comprises an insulative housing having a polarizing feature.

6. The cable plug connector as claimed in claim 1, wherein the cable assembly comprises plural cables angled from a lateral side of the contact assembly and the latch is located proximate to the lateral side of the contact assembly.

7. The cable plug connector as claimed in claim 1, wherein the contact assembly comprises an insulative housing and terminals retained in the insulative housing, the insulative housing defines a pair of enlarged locating lugs at two opposite longitudinal ends for a blind mating of the cable plug connector.

8. A receptacle connector adapted for mating with a right-handed cable plug connector or a left-handed cable plug, the receptacle connector comprising:

a receptacle housing comprising a tongue, and a first side wall and a second side wall both parallel to the tongue;

a plurality of terminals exposed upon the tongue;

a shell surrounding the receptacle housing and comprising two side walls corresponding to the first side wall and the second side wall of the receptacle housing, each of the side walls defining at least one latching hole;

wherein the first side wall of the receptacle housing defines a polarizing feature for mating with the right-handed cable plug connector or the left-handed cable plug.

9. The receptacle connector as claimed in claim 8, wherein the polarizing feature is in a form of a key in an inner side of the first side wall, the key extending in a mating direction of the receptacle connector.

10. A cable plug connector comprising:

a contact assembly comprising an insulative housing and a plurality of terminals, the insulative housing comprising a first side wall and an opposite second side wall;

a cable assembly terminated to the contact assembly and comprising plural cables extending in a lateral direction angled to a mating direction of the cable plug connector; and an insulative cover receiving the contact assembly and the cable assembly;

wherein the first side wall defines only one recessed keyway on an outer side thereof.

11. The cable plug connector as claimed in claim 10, wherein the insulative housing defines two enlarged locating lugs at two opposite longitudinal ends thereof.

12. The cable plug connector as claimed in claim 10, wherein the cover comprises a first blind mating lug and a second blind mating lug extending alongside and downward beyond the first and second side walls, respectively.

13. The cable plug connector as claimed in claim 10, wherein the cables extend out from the second side wall, a latch is attached on the cover and located proximate to the second side wall, and an un-mating assembly is mounted to the cover and located proximate to the latch.

14. The cable plug connector as claimed in claim 10, wherein the cables extend out from the first side wall, a latch is attached on the cover and located proximate to the first side wall, and an un-mating assembly is mounted to the cover and located proximate to the latch.

15. The cable plug connector as claimed in claim 10, wherein a latch is disposed at a bottom of the cover for latching to a receptacle connector.

* * * * *